United States Patent
Ihashi et al.

(10) Patent No.: US 8,131,500 B2
(45) Date of Patent: Mar. 6, 2012

(54) PEDOMETER

(75) Inventors: Tomohiro Ihashi, Chiba (JP); Keisuke Tsubata, Chiba (JP)

(73) Assignee: Seiko Instruments Inc. (JP)

( * ) Notice: Subject to any disclaimer, the term of this patent is extended or adjusted under 35 U.S.C. 154(b) by 292 days.

(21) Appl. No.: 12/082,547

(22) Filed: Apr. 10, 2008

(65) Prior Publication Data

US 2008/0262790 A1  Oct. 23, 2008

(30) Foreign Application Priority Data

Apr. 13, 2007 (JP) ................... 2007-105527
Feb. 7, 2008 (JP) ................... 2008-027245

(51) Int. Cl.
    *G01C 9/00* (2006.01)
(52) U.S. Cl. ........................................ 702/150
(58) Field of Classification Search ........... 702/150, 702/190; 482/8; 701/220; 367/94
    See application file for complete search history.

(56) References Cited

U.S. PATENT DOCUMENTS 4,287,579 A * 9/1981 Inoue et al. ............. 367/94
2002/0089425 A1 7/2002 Kubo et al.
2004/0186695 A1 * 9/2004 Aoshima et al. ............. 702/190
2007/0173378 A1 * 7/2007 Jamsen et al. ............. 482/8
2007/0198187 A1 * 8/2007 Pasolini et al. ............. 701/220

FOREIGN PATENT DOCUMENTS

JP 2005-038018 10/2005

* cited by examiner

*Primary Examiner* — Drew A Dunn
*Assistant Examiner* — Xiuquin Sun
(74) *Attorney, Agent, or Firm* — Adams & Wilks

(57) ABSTRACT

To be able to measure a step number without carrying out an operation processing for selecting a walking sensor in a pedometer using a plurality of walking sensors having sensitivity axes different from each other. OR means converts walking signals inputted in parallel from walking detecting circuits into a synthesized walking signal. CPU calculates the step number by detecting the walking signal inputted to an input port. At this occasion, in detecting the walking signal, CPU alternately carries out a detecting operation of detecting the walking signal and a mask operation which does not detect walking at mask time immediately thereafter at each time of detecting each walking signal.

12 Claims, 10 Drawing Sheets

PEDOMETER

BACKGROUND OF THE INVENTION

1. Field of the Invention

The present invention relates to a pedometer for measuring a step number by detecting walking (including running) of a user, particularly relates to a pedometer including a plurality of walking sensors having sensitivity axes different from each other.

2. Description of the Related Art

In a related art, a pedometer for calculating a step number of a user has been developed by using a plurality of walking sensors having sensitivity axes different from each other.

For example, a pedometer described in Japanese Patent Publication No. 3543778 is constructed by a constitution in which it is selected which output of a walking sensor in a plurality of walking sensors constitutes an object of counting a step number by an operation processing for output signals of the plurality of walking sensors.

Further, a step number operating apparatus described in JP-A-2005-38018 is constructed by a constitution in which an effective component effective for an operation of a step number is extracted from a sum of squares of output signals of a plurality of walking sensors, and the step number is calculated by carrying out an operation processing based on the effective component.

However, according to the pedometer described in Japanese Patent Publication No. 3543778, when the output signal is not provided from the selected walking sensor, for example, as in a case in which an attitude of the pedometer is changed or a user stops walking temporarily, the operation processing for selecting the walking sensor needs to be carried out at each time thereof. Further, even when a signal sufficient for counting the step number is outputted from the plurality of walking sensors, it is necessary to carry out the operation processing for selecting the walking sensor. Therefore, a problem of increasing an operation amount is posed. Further, time is taken for selecting the walking sensor in accordance with an increase in an operation amount, and therefore, there is a concern of bringing about an omission in detecting the step number.

Further, according to the pedometer operation apparatus described in JP-A-2005-38018, it is necessary to carry out operation processing of the operation for calculating the sum of squares of the output signals of the plurality of walking sensors, the processing of extracting the effective component effective for the operation of the step number, the operation of calculating the step number based on the effective component and the like, and therefore, a problem of increasing the operation amount is posed. Further, time is taken for selecting the walking sensor by an increase in the operation amount and there is a concern of bringing about omission in detecting the step number.

SUMMARY OF THE INVENTION

The invention constitutes a problem thereof by enabling to measure a step number without carrying out an operation processing for selecting a walking sensor in a pedometer using a plurality of walking sensors having sensitivity axes different from each other.

Further, the invention constitutes a problem by restraining occurrence of an omission of detecting a step number by dispensing with an operation processing for selecting a walking sensor.

It is an aspect of the present invention to provide a pedometer having walking sensors sensitivity axes of which differ from each other, and including a plurality of walking detecting means for outputting walking signals in correspondence with walking detected by the walking sensors, and calculating means for detecting the walking signals from the plurality of walking detecting means and calculating a step number based on the detected walking signals, wherein the calculating means alternately carries out a detecting operation of detecting the walking signals and a mask operation which does not detect the walking signals in predetermined mask time after the detecting operation when the walking signals are detected.

Further, the walking sensor may be a walking sensor for detecting a step number for one sensitivity axis, or a walking sensor having a plurality of pieces of portions of detecting one sensitivity axis at one element such that a plurality of detecting portions are formed on a diaphragm.

There may be constructed a constitution in which when the walking signals are detected, the calculating means starts an operation of alternately carrying out the detecting operation and the mask operation from when the walking signals are detected first.

Further, there may be constructed a constitution including storing means for storing the mask time, wherein the calculating means detects the walking signals in reference to the mask time.

There may be constructed a constitution in which the calculating means includes converting means for synthesizing the walking signals inputted in parallel from the plurality of walking detecting means to convert into a synthesized walking signal, wherein when the calculating means detects the synthesized walking signal, a detecting operation of detecting the synthesized walking signal and the mask operation at the mask time after the detecting operation are alternately carried out.

There may be constructed a constitution in which the converting means is logical operating means for converting the walking signals inputted in parallel from the plurality of walking detecting means into the synthesized walking signal synthesized by logically operating the walking signals.

There may be constructed a constitution in which when the synthesized walking signal is detected, the calculating means starts the operation of alternately carrying out the detecting operation and the mask operation from when the synthesized walking signal is detected first.

There may be constructed a constitution in which the calculating means sets a value based on a walking pitch as the mask time. Further, there may be constructed a constitution in which the calculating means sets the mask time to a value of a range equal to or larger than a half of a walking signal period of the walking signal in correspondence with a lower limit of the measurable walking pitch and equal to or smaller than the walking signal period of the walking signal in correspondence with an upper limit value of the measurable walking pitch.

There may be constructed a constitution including storing means for storing the mask time, wherein the calculating means detects the synthesized walking signal in reference to the mask time.

Further, there may be constructed a constitution including mask time changing means for setting the mask time to mask time in accordance with an immediate proximity of the walking pitch.

Further, there may be constructed a constitution in which when the immediate proximity of the pitch is changed by a predetermined value or more, the mask time changing means tentatively sets the mask time to mask time in correspondence with the immediate proximity of the pitch and sets the tentatively set mask time to regular mask time when a correct walking signal is provided by the tentatively set mask time, when the tentatively set mask time is set as the regular mask time, the calculating means corrects an accumulated step number by a step number generated in the tentatively setting period.

Further, there may be constructed a constitution in which the walking sensor is an acceleration sensor for outputting an acceleration signal of a level in correspondence with an acceleration, when the immediate proximity of the pitch is changed by the predetermined value or more, the mask time changing means sets the mask time to mask time in accordance with the level of the acceleration signal outputted from the acceleration sensor.

Further, there may be constructed a constitution in which the walking sensor is an acceleration sensor for outputting an acceleration signal of a level in accordance with an acceleration, further including mask time changing means for setting the mask time to mask time in accordance with the level of the acceleration signal.

Further, there may be constructed a constitution including mask time initial value setting means for setting an initial value of the mask time based on the walking pitch provided from a past walking data stored to the storing means.

Further, there may be constructed a constitution including mask time initial value setting means having inputting means for setting an initial value of the mask time based on a personal data inputted from the inputting means.

According to the invention, the step number can be measured without carrying out the operation processing for selecting the walking sensor.

Further, according to the invention, the operation processing for selecting the walking sensor is dispensed with, and therefore, occurrence of an omission of detecting the step number can be restrained.

Further, the mask time is changed in accordance with walking, and therefore, even when the walking speed is changed, or even when the pedometer is commonly used by a plurality of persons having different walking speeds, the step numbers of the respective users can accurately be measured.

DETAILED DESCRIPTION OF THE PREFERRED EMBODIMENTS

A pedometer according to an embodiment of the invention will be explained as follows. Further, in respective drawings the same portions are attached with the same notations.

Figure 1:
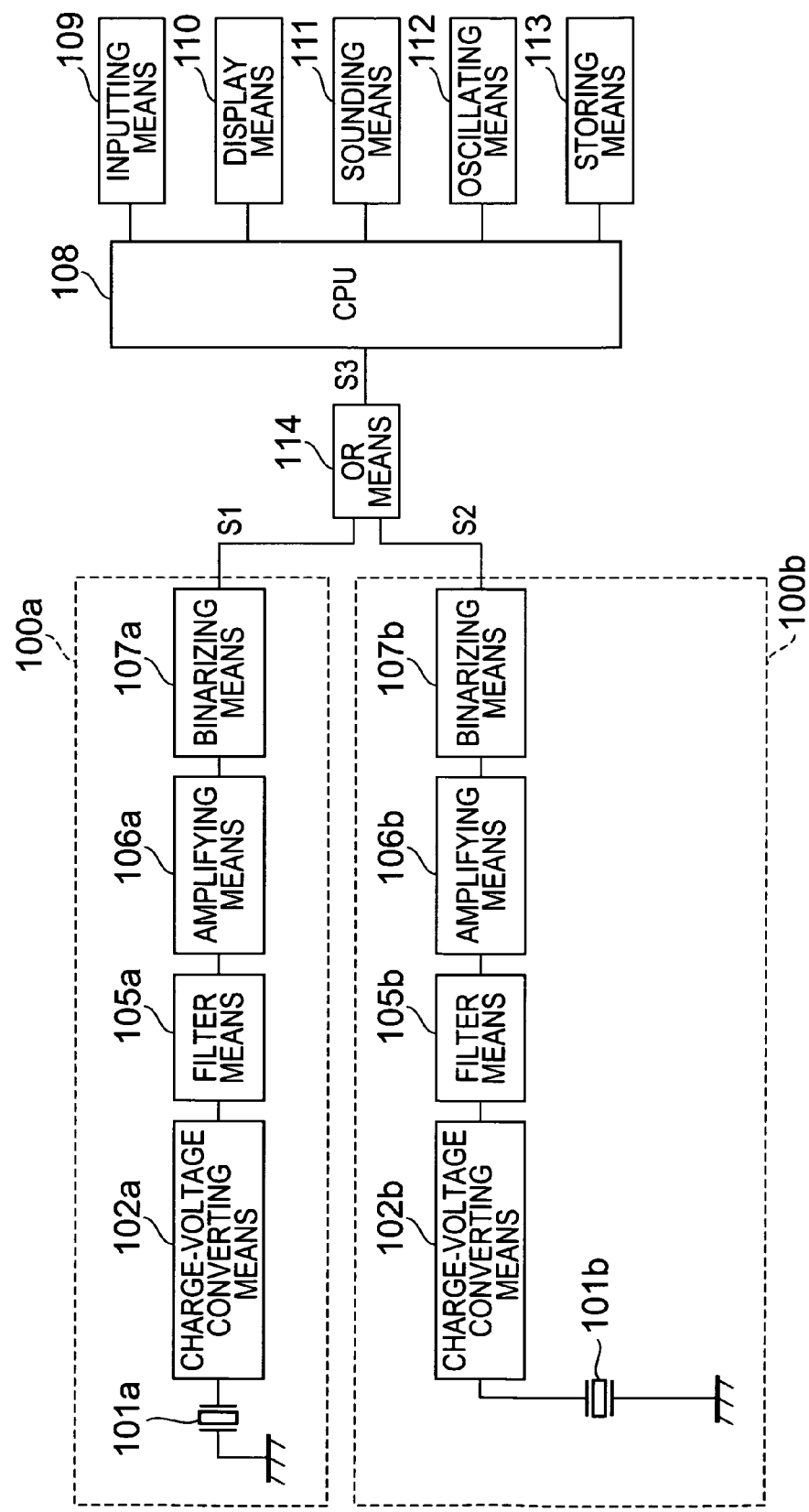
FIG. 1 is a block diagram of a pedometer according to an embodiment of the invention.

FIG. 1 is a block diagram of a pedometer according to an embodiment of the invention.

In FIG. 1, a pedometer includes a first walking detecting circuit 100a, a second walking detecting circuit 100b, a central processing unit (CPU) 108 for carrying out a step number calculating processing based on walking signals from the first and the second walking detecting circuits 100a and 100b, inputting means 109 constituted by an operation switch for carrying out various operations of a pedometer measurement starting operation and the like, display means 110 for displaying a measured step number or pitch, sounding means 111 for alarming by sound, oscillating means 112 for generating a signal constituting a base of a reference clock signal for CPU 108 or a time signal when time counting operation is carried out, storing means 113, and OR means 114 for carrying out a logical sum (OR) processing of the walking signals from the first and the second walking detecting circuits 100a and 100b to output to CPU 108.

The first walking detecting circuit 100a includes a walking sensor (according to the embodiment, a piezoelectric element constituting an acceleration sensor) 101a for outputting a walking signal of a corresponding electric charge at each time of detecting walking of a user, charge-voltage converting means 102a for converting the walking signal from the walking sensor 101a into a walking signal of a corresponding voltage to output, filter means 105a for outputting a walking signal by removing noise in a signal outputted from the charge-voltage converting means 102a, amplifying means 106a for amplifying a walking signal from the filter means 105a to output, and binarizing means 107a for converting a walking signal in an analog signal type from the amplifying means 106a into a walking signal S1 of a digital signal type to output.

The second walking detecting circuit 100b is constituted similar to the first walking detecting circuit 100a. That is, the second walking detecting circuit 100b includes a walking sensor (according to the embodiment, a piezoelectric element constituting an acceleration sensor) 101b for outputting a walking signal of a corresponding electric charge at each time of detecting walking of a user, charge-voltage converting means 102b for converting the walking signal from the walking sensor 101b into a walking signal of a corresponding voltage to output, filter means 105b for outputting a walking signal by removing noise in the signal outputted from charge-voltage converting means 102b, amplifying means 106b for amplifying a walking signal from the filter means 105b to output, and binarizing means 107b for converting a walking signal in an analog signal type from the amplifying means 106b into a walking signal S2 of a digital signal type to output.

The walking sensor 101a and the walking sensor 101b are constituted such that sensitivity axes differ from each other (for example, sensitivity axes differ from each other by 90 degrees).

The walking sensors 101a, 101b can use also other walking sensors of mechanical walking sensors or the like and are not limited to the acceleration sensors of the piezoelectric elements or the like.

The OR means 114 can be constituted by an OR element comprising a hardware circuit of a semiconductor element. The OR means 114 aligns the walking signals S1 and S2 inputted in parallel from the first and the second walking detecting circuits 100a and 100b in an order of being inputted to be converted into a synthesized walking signal S3 to be outputted to CPU 108.

The storing means 113 is constituted by ROM stored with a program executed by CPU 108 and RAM used as a work region when CPU 108 executes the program. RAM is stored with data of mask time constituting predetermined time during which an operation of detecting the walking signal is not carried out (that is, mask operation is carried out) and a measured step number.

CPU 108 can measure time of walking time or the like based on an oscillating signal of the oscillating means 112 in accordance with an operation of the inputting means 109.

The binarizing means 107a and 107b are constituted by comparators having predetermined thresholds.

CPU 108 includes one input terminal, detects the walking signals of the digital signal types inputted from the plurality of first and second walking detecting circuits 100a and 100b to the input terminal by way of the OR means 114 and carries out a step number calculating processing based on the detected walking signals. Although the walking signal detecting processing of CPU 108 will be described later, when the walking signals are detected, a detecting operation of detecting the walking signals and a mask operation of not detecting the walking signals in a predetermined mask time after the detection operation are operated to carry out alternately.

Further, the first and the second walking detecting circuits 100a and 100b respectively constitute first and second walking detecting means and can output the binarized walking signals S1 and S2 in correspondence with walking of the user to the OR means 114. The OR means 114 constitutes converting means and can convert the walking signals S1 and S2 inputted in parallel from the first and the second walking detecting circuits 100a and 100b into a synthesized walking signal S3 to output. Calculating means is constituted by CPU 108 and the OR means and can calculate the step number based on the walking signal S3 from the plurality of walking detecting circuits 100a and 100b.

FIGS. 2A, 2B, 2C, 2D and 2E are timing charts for explaining a total operation of the pedometer according to the embodiment, and signals the same as those of FIG. 1 are attached with the same notations.

FIGS. 2A, 2B and 2C show the walking signal S1 outputted from the first walking detecting circuit 100a, the walking signal S2 outputted from the second walking detecting circuit 100b, and the synthesized walking signal S3 outputted from OR means 114.

FIG. 2D shows a timing of detecting to process the walking signal S3 by CPU 108. The processing of detecting walking signal is operated to detect the signal by a rise edge of the walking signal S3 and not to detect the walking signal S3 (carries out mask operation) by constituting mask time (bold line portion of FIG. 2D) by predetermined time immediately after detecting the signal. In this way, CPU 108 is operated to alternately carry out a detecting operation of detecting the walking signal and a mask operation of not detecting the walking signal in the predetermined mask time after the detecting operation when CPU 108 detects the walking signal.

Further, FIG. 2E shows a total flow when CPU 108 measures the step number based on the walking signal S3. Although details of the step number measuring operation will be described later, when generally explained, first, CPU 108 detects the signal from the OR means 114 (in other words, detects the signal from the walking sensor 101a or 101b). Thereby, when it is confirmed that the signal is generated continuously for a predetermined time (continuity of walking signal), it is determined that a regular walking signal is provided and the step number is calculated based on the walking signal S3. Thereafter, when the walking signal S3 cannot be detected, it is determined that walking is stopped and the operation of detecting the signal is carried out again.

Figure 3:
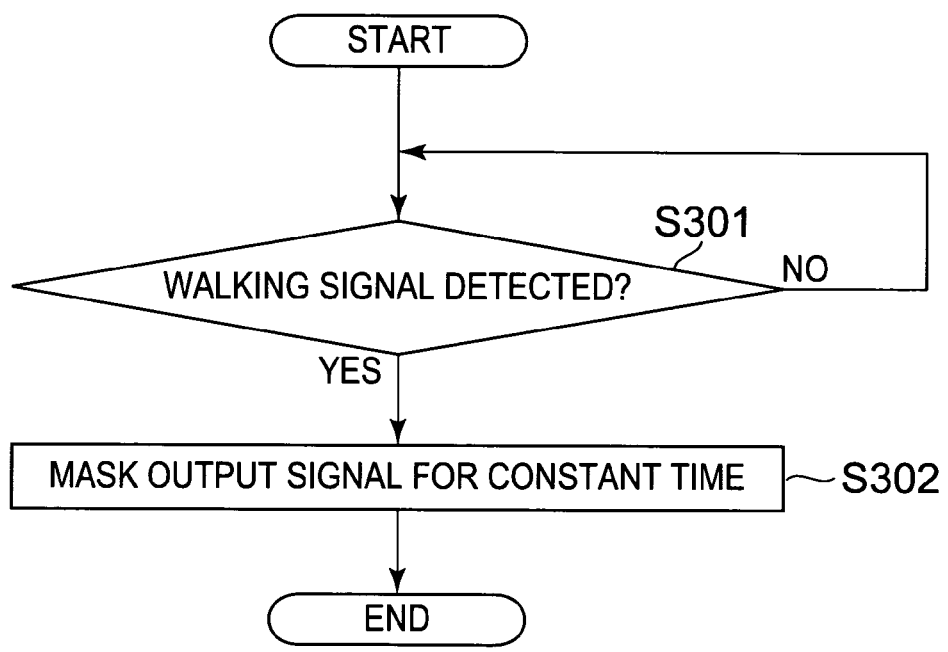
FIG. 3 is a flowchart showing a walking detecting processing of the pedometer according to the embodiment of the invention.

FIG. 3 is a flowchart showing a processing of the pedometer according to the embodiment, showing a detecting processing when CPU 108 detects the respective walking signals S3. The detecting processing is carried out by loading a program stored to ROM of the storing means 113 to RAM of storing means 113 to execute by CPU 108.

In FIG. 3, when it is detected that the walking signal is outputted from at least one of the walking sensors 101a and 101b by detecting the walking signal S3 from the OR means 114 (step S301), CPU 108 carries out the mask operation without detecting the walking signal S3 for constant time (mask time) immediately after detecting the walking signal S3 (step S302).

The processing is carried out at each time of detecting each walking signal S3. Thereby, the step number can be measured based on the walking signal in correspondence with walking detected by the one walking sensor 101a or the one 101b by excluding erroneous measurement based on an influence of noise or the walking signal detected by other walking signal, and the step number can be measured accurately.

Figure 2:
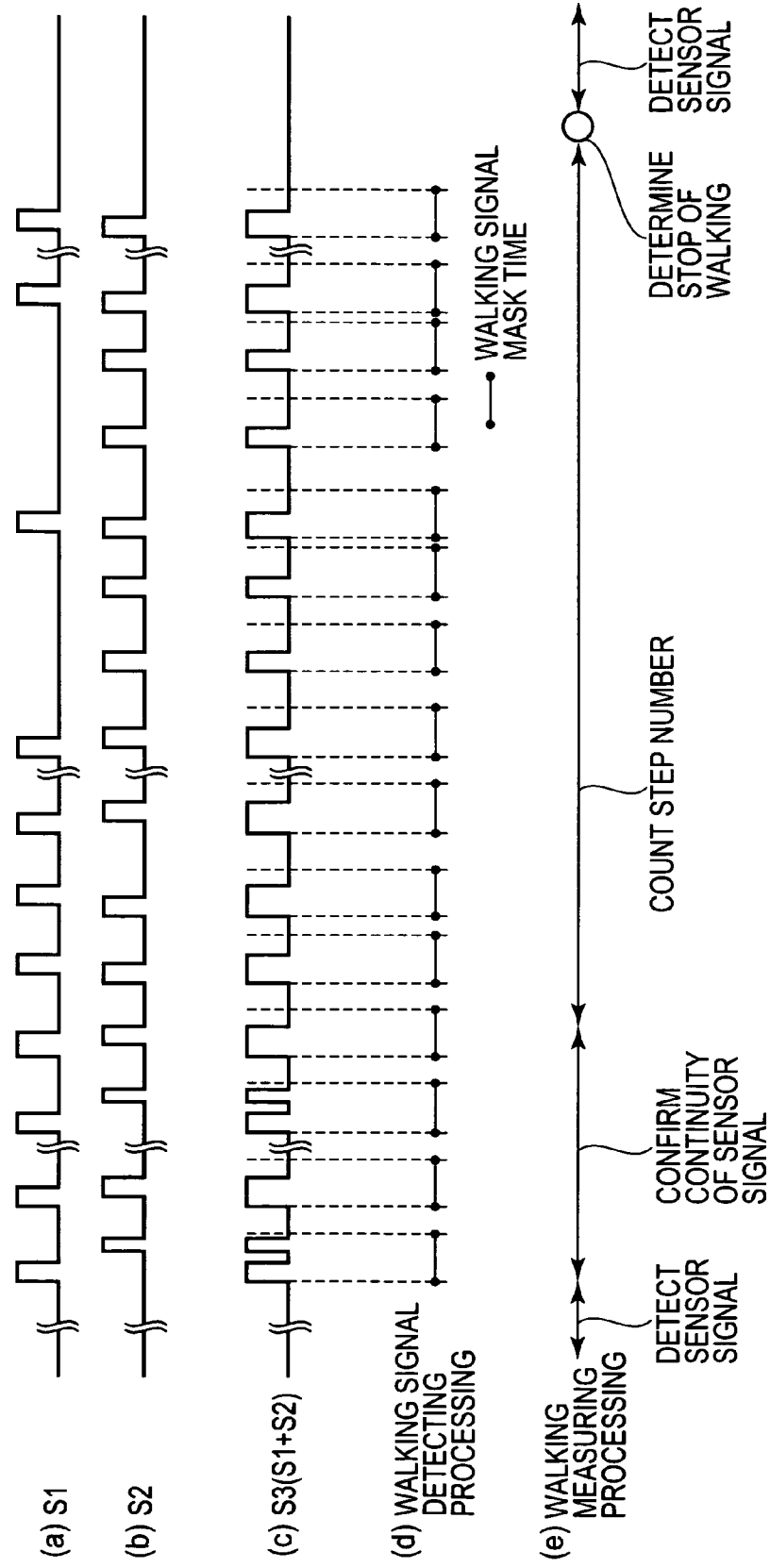
FIGS. 2A, 2B, 2C, 2D and 2E are timing charts of the pedometer according to the embodiment of the invention.
Figure 4:
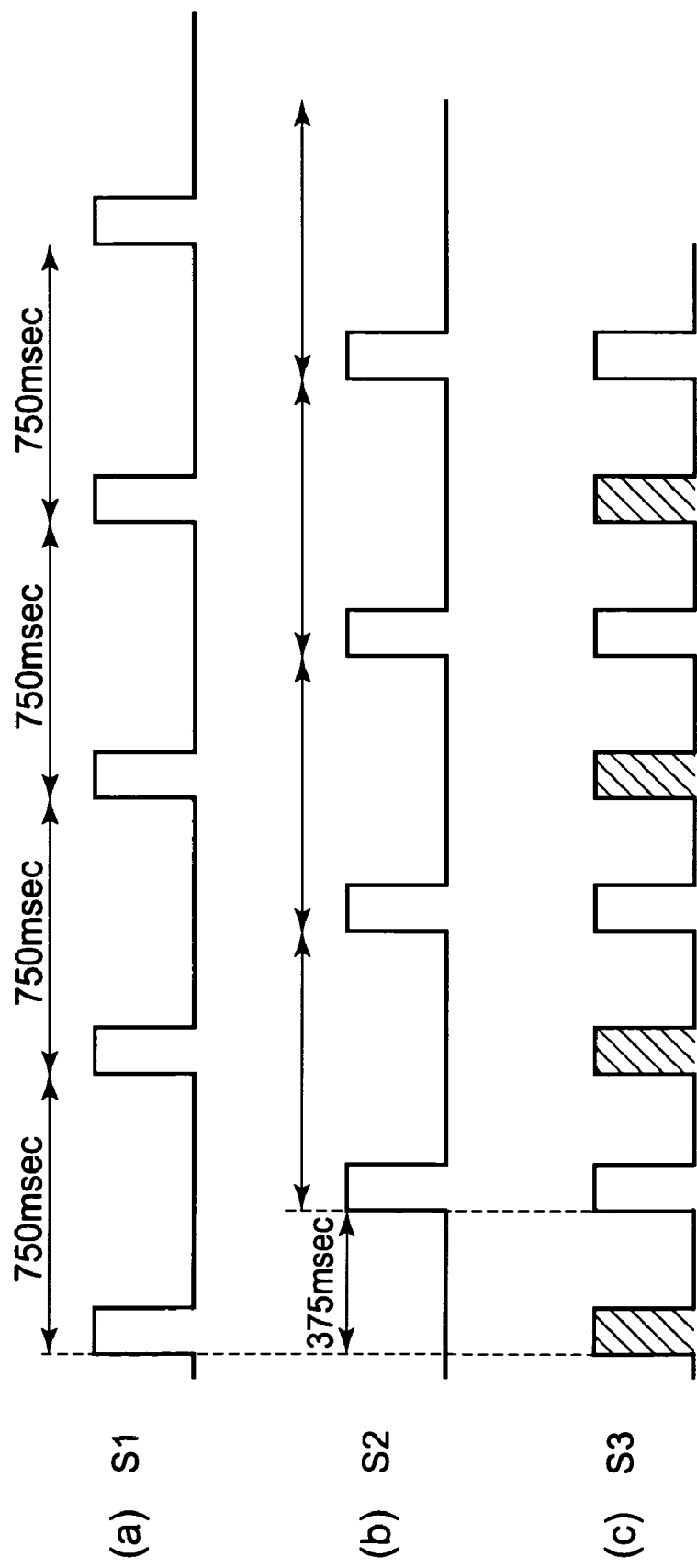
FIGS. 4A, 4B and 4C are timing charts of the pedometer according to the embodiment of the invention.

FIGS. 4A, 4B and 4C are diagrams showing examples of setting the mask time, and the signals the same as those of FIG. 2 are attached with the same notations.

Assume that a range of measurable walking pitch is 80 through 140 steps/minute. A walking signal period in correspondence with 140 steps/minute becomes about 42.9 msec. When more or less fluctuation is brought about, there is a possibility of generating the signal by a period shorter than 429 msec, and therefore, it is preferable to set the range by time shorter than 429 msec.

On the other hand, when walked by 80 steps/minute and outputs of the two walking sensors 101a and 101b appear by constituting phases respectively inverse to each other, the walking signals S1 and S2 outputted from the first and the second walking detecting circuits 100a and 100b and the walking signal S3 outputted from the OR means 114 become as shown by FIGS. 4A, 4B and 4C. At this occasion, in order to accurately measure the step number, it is necessary to extract only the walking signal S3 netted in FIG. 4C, and therefore, a portion which is not netted is masked not to be detected. For that purpose, it is preferable to set time equal to or longer than 375 msec constituting a half of a period 750 msec corresponding to 80 steps/minute as the mask time.

By the above-described, the mask time when the range of the measurable walking pitch is set to 80 through 140 steps/minute is set to a value within the range of 375 msec through 429 msec, for example, 400 msec. That is, in order to measure the step number further accurately, it is preferable to set the mask time to a value in a range equal to or longer than the half of the walking signal period in correspondence with the walking pitch of a measurable lower limit and equal to or shorter than the walking signal in correspondence with the walking pitch of a measurable upper limit. The mask time may be constituted to be previously stored to the storing means 113, or may be stored to the storing means 113 by setting the mask time by the inputting means. Or, the mask time may be set by the inputting mean is stored to the storing means 113. The step number can further accurately be measured by setting the mask time while pertinently adjusting the mask time by the inputting means.

Figure 5:
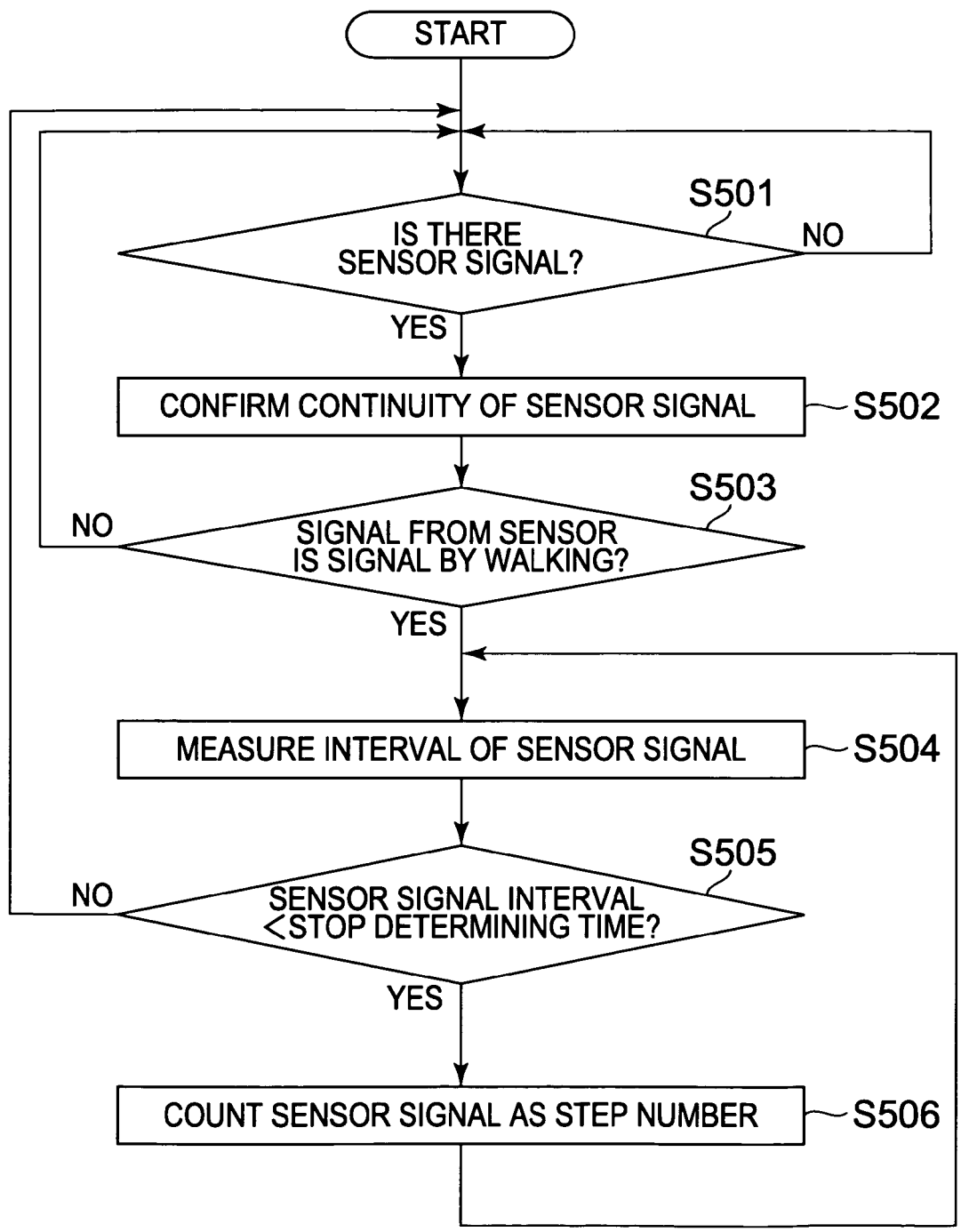
FIG. 5 is a flowchart showing a processing of the pedometer according to the embodiment of the invention.

FIG. 5 is a flowchart showing the step number measuring processing of the pedometer according to the embodiment. The processing is carried out by loading the program stored to ROM of the storing means 113 to RAM of the storing means 113 to execute by CPU 108.

The operation of the pedometer according to the embodiment will be explained in details in reference to FIG. 1 through FIG. 5 as follows.

The step number measuring processing is started by carrying out a starting operation by the inputting means 109 by a user mounted with the pedometer at the own arm or the like.

When the user starts walking, the walking sensor 101a detects walking and outputs the corresponding walking signal of the charge. The walking signal from the walking sensor 101a is converted into the voltage by the charge-voltage converting means 102a, thereafter, amplified by the amplifying means 106a to output by way of the filter means 105a. The output signal of the amplifying means 106a is converted into the walking signal S1 digitized by the binarizing means 107a, thereafter, inputted to the OR means 114.

At the same time, the walking sensor 110b detects walking and outputs the corresponding walking signal of the charge. The walking signal from the walking sensor 101b is converted into the voltage by the charge-voltage converting means 102b, thereafter, amplified by the amplifying means 101b to be outputted by way of the filter means 105b. The output signal of the amplifying means 106b is converted into the walking signal S2 digitized by the binarizing means 107b, thereafter, inputted to the OR means 114.

The OR means 114 converts the respective walking signals S1 and S2 inputted in parallel from the first and the second walking detecting circuits 100a and 100b into the synthesized walking signal S3 by aligning the walking signals S1 and S2 in the order inputted to be inputted to CPU 108.

When it is determined that there is a signal from at least one of the walking sensors 101a and 101b based on the walking signal S3 from the OR means 114 (step S501), CPU 108 confirms that the signal from at least one of the walking sensors 101a and 101b is provided continuously for predetermined time based on the walking signal S3 (continuity) (step S502). Here, the predetermined time can be set to time to a degree normally required for walking of 5 steps (for example, 10 seconds).

Further, when the signal outputted from the OR means 114 is detected, as described above, CPU 108 is operated to alternately carry out the detecting operation and the mask operation at each time of detecting the respective signals. Further, when the walking signal is detected, CPU 108 can start the operation of alternately carrying out the detecting operation and the mask operation from when the walking signal S3 is detected first. Thereby, the walking signal S3 from the walking sensor 101a or 101b precedingly detecting the walking signal S3 can successively be detected and the step number can be measured accurately and swiftly.

When the walking signal S3 from the OR means 114 is provided continuously for the predetermined time period, that is, when the signal from at least one of the walking sensors 101a and 101b is provided continuously for the predetermined time period, CPU 108 determines that the signal from at least one of the walking sensors 101a and 101b (in other words, the walking signal S3) is the walking signal in correspondence with the walking (step S503).

Next, CPU 108 measures an interval of the walking signal from the walking sensor 101a or 101b which is to be used for detecting walking based on the walking signal S3 from the OR means 114 (step S504).

When the interval of the walking signal S3 from the OR means 114 is smaller than predetermined stop determining time, that is, when the interval of the walking signal from the walking sensor 101a or 101b to be used for detecting walking is smaller than the predetermined stop determining time, CPU 108 determines the walking signal by regular walking (step S505), counts the walking signal S3 from the OR means 114 as the step number and returns to the processing step S504 (step S506). Here, the stop determining time period can be set to time to a degree normally required for walking, for example, one step (for example, 2 seconds).

On the other hand, when the interval of the walking signal from the walking sensor 101a or 101b is not smaller than the predetermined stop determined time period at the processing step S505, CPU 108 determines that the signal from the OR means 114 is not the walking signal by the regular walking and returns to the processing step S501.

Further, when it is determined that the signals from the walking sensors 101a and 101b are not signals by walking at the processing step S503, CPU 108 determines that the walking signal is not provided from the walking sensors 101a and 101b and walking is stopped, and returns to the processing step S501.

As described above, according to the pedometer according to the embodiment, the walking signals S1 and S2 inputted in parallel from the plurality of walking detecting circuits 100a and 100b are converted into the synthesized walking signal S3 by the OR means 114, and CPU 108 calculates the step number by detecting the walking signal S3 inputted to an input port thereof. At this occasion, CPU 108 is constituted to alternately carry out the detecting operation and the mask operation at each time of detecting the synthesized walking signal S3.

Therefore, the step number can be measured without carrying out an operation processing for selecting the walking sensors 101a and 101b.

Further, the operation processing for selecting the walking sensors 101a and 101b is dispensed with, and therefore, occurrence of omission of detecting the step number can be restrained.

Further, even when a number of the walking sensors is increased, a special operation for selecting the walking sensor is not needed and although output signals from the plurality of walking sensors are dealt with, an operation amount becomes equivalent to that of one axis pedometer.

Further, for example, even when the walking sensor for detecting walking is changed by changing an attitude of the pedometer in walking, the step number can be measured without needing a special processing for selecting the walking sensor.

Further, it is not necessary to recognize from which sensor of the signal the input signal to CPU is, and therefore, an effect of few control items in design is also achieved.

Further, a power source for supplying a drive power to a constituent element of the pedometer, control means for controlling to supply the drive power from the power source to respective walking detecting circuits, and determining means for determining the walking detecting circuit including the walking sensor which is not used for detecting walking may be provided, by the control means, the power source may be stopped to supply to the walking detecting circuit including the walking sensor which is not used for detecting the walking.

Further, there may be constructed a constitution in which CPU including a plurality of input ports is used, and the step number is measured by inputting in parallel the walking signals from the plurality of walking detecting circuits to the respective input ports. In this case, the walking signal is detected by alternately carrying out the detecting operation and the mask operation.

Further, although according to the embodiment, two of the walking sensors 101*a* and 101*b* are used, there can be constructed a constitution in which 3 or more of walking sensors having sensitivity axes different from each other are used. For example, in the case of 3 of the walking sensors, the sensitivity axes can be constituted to differ from each other by 90 degrees.

Further, although according to the embodiment, an explanation has been given of the example of the pedometer of the wristwatch type used by being mounted to the arm of the user, the invention is applicable to various kinds of pedometers of a pedometer of a type of being used by being mounted to the waist, a pedometer of a type of being used in a state of being held by being contained in a bag or the like, a pedometer including a timepiece function and the like.

Further, although according to the embodiment, the OR processing is carried out before being inputted to CPU 108 as shown by FIG. 1, the walking signals 81 and 82 outputted from the first and the second walking detecting circuits 100*a* and 100*b* may respectively be inputted to CPU 108, and CPU 108 may execute an OR instruction in RAM or in a register after inputting the walking signals 81 and 52 as input signals of the port.

Meanwhile, according to the above-described embodiment, the mask time is fixedly set to a predetermined value, and therefore, an upper and a lower limit of the detectable pitch (step/minute) is restricted to upper limit=lower limit×2 and there is a concern that the step number cannot be measured accurately. An explanation will be given of a pedometer resolving the problem by making the mask time variable as follows.

Figure 6:
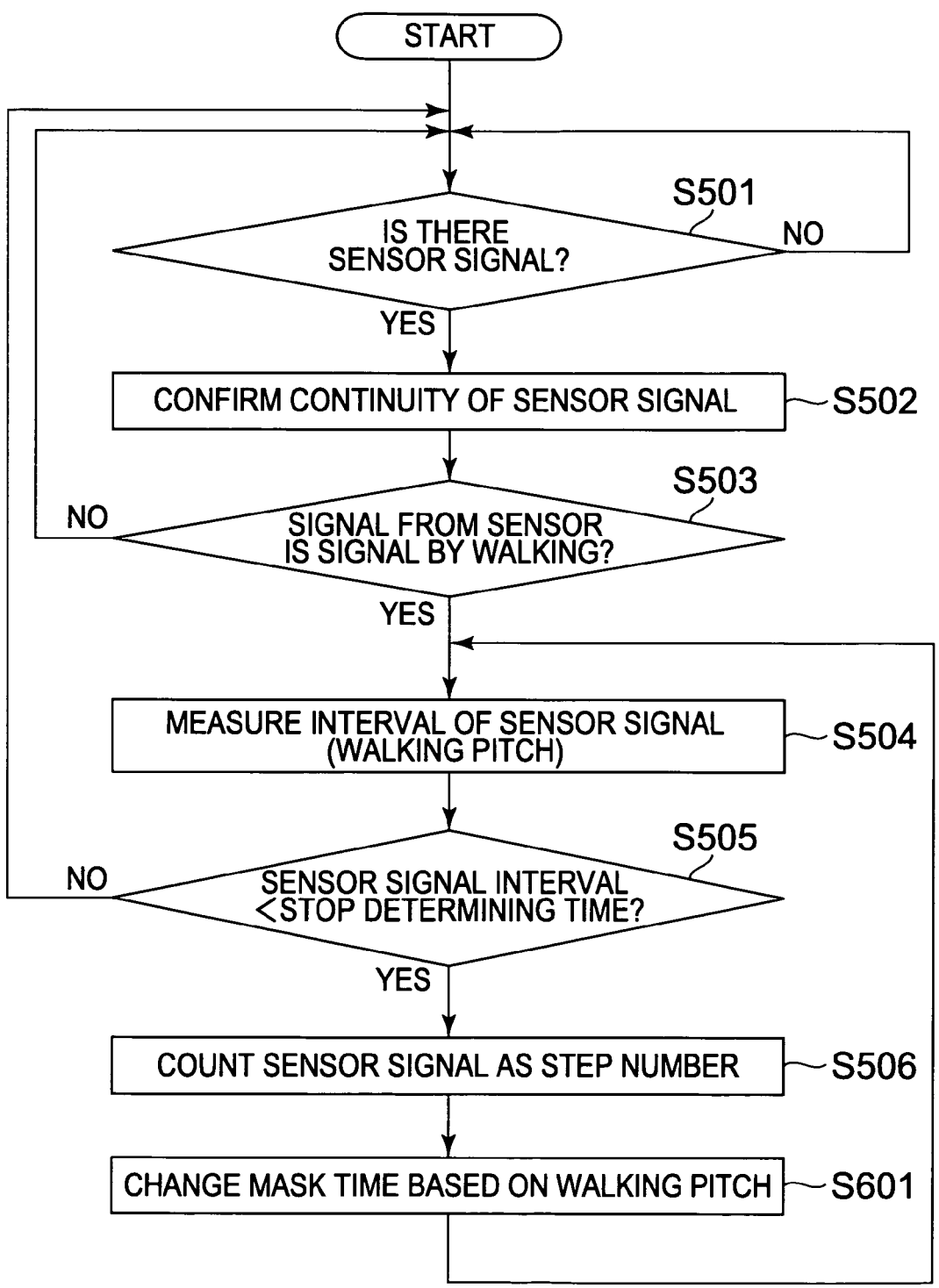
FIG. 6 is a flowchart showing a processing of the pedometer according to the embodiment of the invention.

FIG. 6 is a flowchart showing a processing of a pedometer according to other embodiment of the invention, showing an example of setting the mask time based on an immediate walking pitch. Further, portions the same as those of FIG. 5 are attached with the same notations. Further, a block diagram of the other embodiment is the same as FIG. 1.

An operation of the other embodiment will be explained in reference to FIG. 1 and FIG. 6 as follows.

When it is determined that there is a signal from at least one of the walking sensors 101*a* and 101*b* based on the walking signal S3 from the OR means 114 (step S501), CPU 108 confirms that the signal from at least one of the walking sensors 101*a* and 101*b* is provided continuously for predetermined time based on the walking signal S3 (continuity) (step S502). Here, the predetermined time can be set to time to a degree normally required for walking of, for example, 5 steps (for example, 10 seconds).

Further, when the signal outputted from the OR means 114 is detected, as described above, CPU 108 is operated to alternately carry out the detecting operation and the mask operation at each time of detecting the respective signals. Further, when the walking signal is detected, CPU 108 can start the operation of alternately carrying out the detecting operation and the mask operation from when the walking signal S3 is detected first. Thereby, the walking signal S3 from the walking sensor 101*a* or 101*b* precedingly detecting the walking signal S3 can successively be detected and the step number can accurately and swiftly be measured.

When the walking signal S3 from the OR means 114 is provided continuously for predetermined time, that is, when the signal from at least one of the walking sensors 101*a* and 101*b* is provided continuously for the predetermined time period, CPU 108 determines that the signal from at least one of the walking sensors 101*a* and 101*b* (in other words, the walking signal S3) is a walking signal in correspondence with walking (step S503).

Next, CPU 108 measures an interval of the walking signal (walking pitch) from the walking sensor 101*a* or 101*b* to be used for detecting walking based on the walking signal S3 from the OR means 114 (step S504).

When the interval of the walking signal S3 from the OR means 114 is smaller than predetermined stop determining time, that is, when the interval of the walking signal from the walking sensor 101*a* or 101*b* to be used for detecting walking is smaller than the predetermined stop determining time, CPU 108 determines the walking signal by regular walking (step S505) and counts the walking signal S3 from the OR means 114 as the step number (step S506). The stop determining time is time constituting a reference of determining whether walking is carried out or walking is stopped, and can be set to time to a degree normally required for walking of, for example, 1 step (for example, 2 seconds).

The storing means 113 is previously stored with a table corresponding to pluralities of walking pitches and mask time widths (walking pitch-mask time width table), and CPU 108 sets a range of detecting the walking pitch based on an immediate walking pitch calculated at the processing step S504, changes the already installed mask time a to mask time in correspondence with the detecting range, thereafter, returns to the processing step S504 (step S601). Here, CPU 108 functions as mask time changing means.

Further, the processing of changing the mask time of the processing step S601 may be carried out at each time of detecting walking, and can be changed variously such that the processing is constituted to be carried out at each time of detecting a plurality of steps.

On the other hand, when the interval of the walking signal from the walking sensor 101*a* or 101*b* is not shorter than the predetermined stop determining time at the processing step S505, it is determined that the signal from the OR means 114 is not a walking signal by regular walking and returns to the processing step S501.

Further, when it is determined that the signals from the walking sensors 101*a* and 101*b* are not signals by walking at the processing step S503, CPU 108 determines that the walking signals are not provided from the walking sensors 101*a* and 101*b* and walking is stopped and returns to the processing step S501.

As described above, according to the other embodiment, the immediate walking pitch is calculated, the mask time is changed based on the walking pitch, and therefore, the step number can be measured accurately even when the same user changes the walking pitch or even when a plurality of users having different walking pitches commonly use the pedometer.

Figure 7:
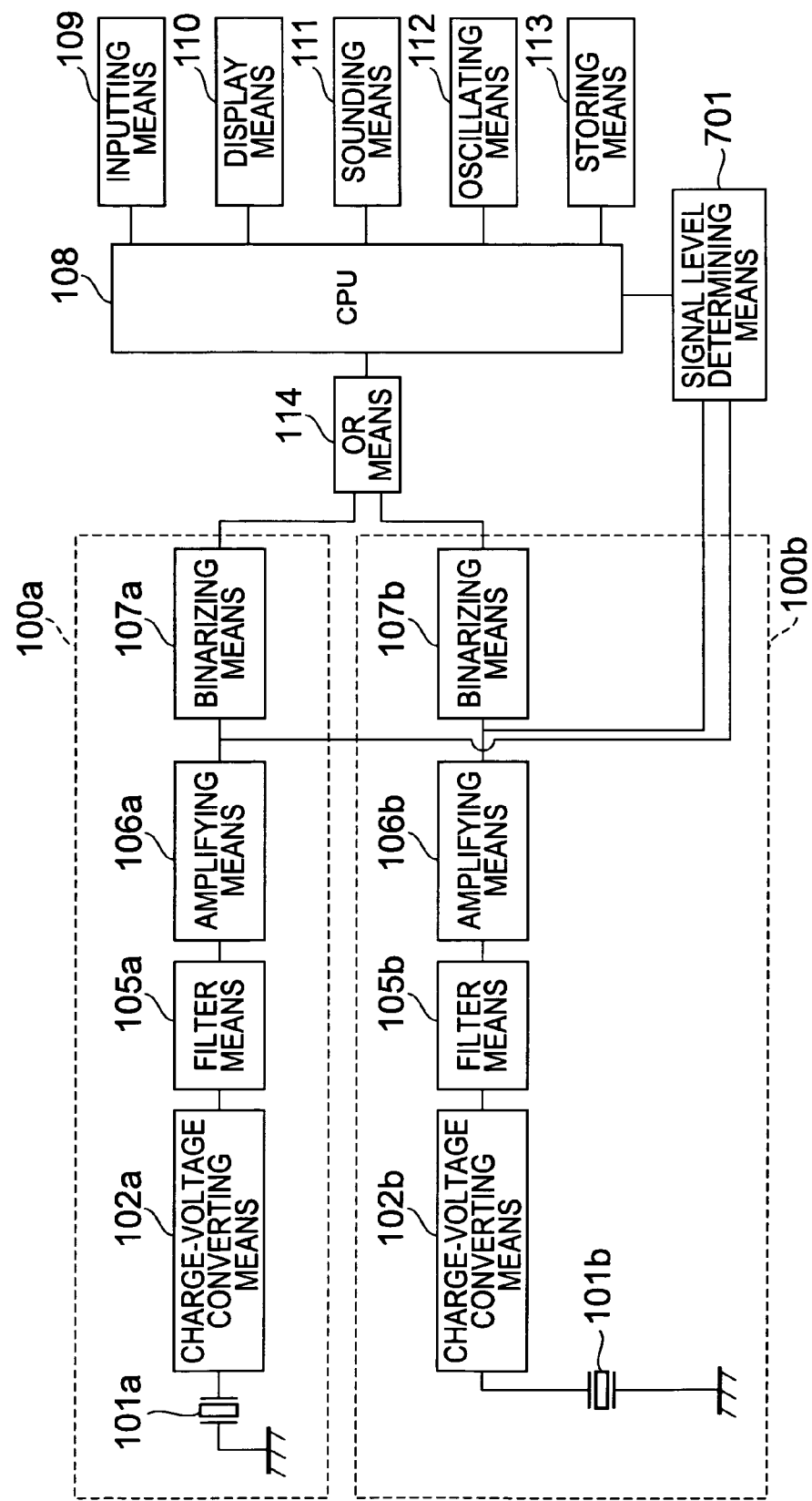
FIG. 7 is a block diagram of a pedometer according to other embodiment of the invention.

FIG. 7 is a block diagram of a pedometer according to still other embodiment of the invention, and portions the same as those of FIG. 1 are attached with the same notations. A point of a difference from the embodiment of FIG. 1 resides in that there is provided signal level determining means 701 for determining output signal levels of the amplifying means 106*a* and 106*b*, in other words, determining signal levels of accelerations outputted from the walking sensors 101*a* and 101*b*. CPU 108 determines a walking speed by the acceleration signal level and sets the mask time to mask time in correspondence with the acceleration sensor signal level.

Figure 8:
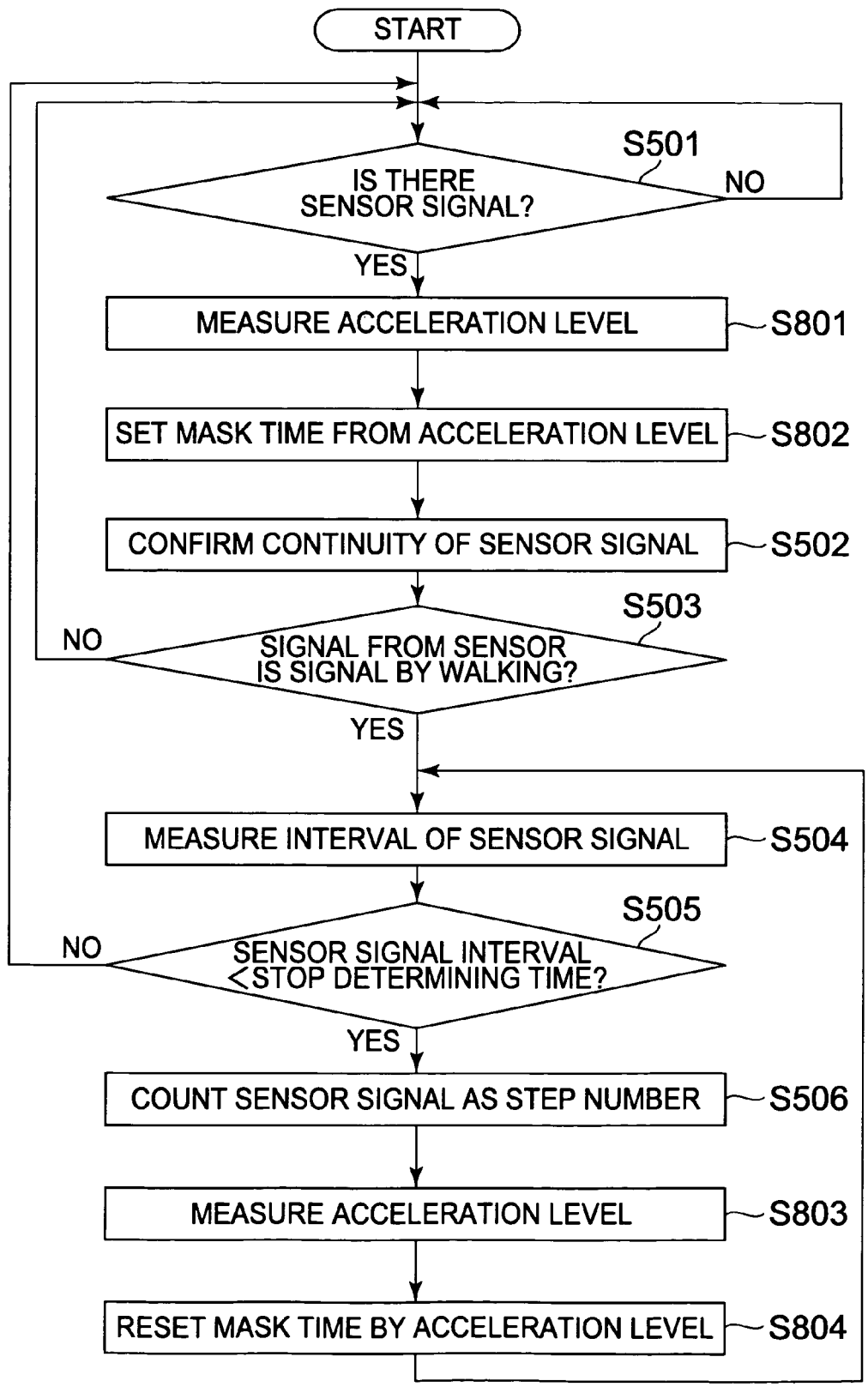
FIG. 8 is a flowchart showing a processing of the pedometer according to the embodiment of the invention.

FIG. 8 is a flowchart showing a processing of the pedometer according to the other embodiment, showing an example of setting mask time by determining a walking pitch based on the acceleration signal level. Portions the same as those of FIG. 5 are attached with the same notations.

An operation of the other embodiment will be explained in reference to FIG. 7 and FIG. 8 as follows.

When CPU 108 determines that there is a signal from at least one of the walking sensors 101a and 101b based on the walking signal S3 from the OR means 114 (step S501), the signal level determining means 701 determines a level of the signal (acceleration signal) from the amplifying means 106a or 106b in correspondence with the walking sensors 101a or 101b which CPU 108 determines that there is a signal (step S801).

The storing means 113 is previously stored with a table corresponding to pluralities of acceleration signal levels and mask time widths (acceleration level-mask time width table), and CPU 108 sets the mask time in correspondence with the acceleration signal level determined by the signal level determining means 701 in reference to the table (step S802). Here, CPU 108 functions as mask time changing means.

Next, CPU 108 confirms that the signal from at least one of the walking sensors 101a and 101b is provided continuously for predetermined time based on the walking signal S3 (continuity) (step S502). Here, the predetermined time can be set to time to a degree normally required for walking of 5 steps (for example, 10 seconds).

Further, when the signal outputted from the OR means 114 is detected, as described above, CPU 108 is operated to alternately carry out the detecting operation and the mask operation at each time of detecting each signal. Further, CPU 108 can start the operation of alternately carrying out the detecting operation and the mask operation from when the walking signal S3 is detected first, when the walking signal is detected. Thereby, the walking signal S3 from the walking sensors 101a or 101b precedingly detecting the walking signal S3 can successively be detected and the step number can accurately and swiftly be measured.

When the walking signal S3 from the OR means 114 is provided continuously for the predetermined time, that is, when the signal from at least one of the walking sensors 101a and 101b is provided continuously for the predetermined time, CPU 108 determines that the signal from at least one of the walking sensors 101a and 101b (in other words, walking signal S3) is the walking signal in correspondence with walking (step S503).

Next, CPU 108 measures an interval of the walking signal (walking pitch) from the walking sensor 101a or 101b to be used for detecting walking based on the walking signal S3 from the OR means 114 (step S504).

When the interval of the walking signal S3 from the OR means 114 is shorter than predetermined stop determining time, that is, the interval of the walking signal from the walking sensor 101a or 101b to be used for detecting walking is shorter than the predetermined stop determining time, CPU 108 determines the walking signal by regular walking (step S505), and counts the walking signal S3 from the OR means 114 as the step number (step S506).

Next, the signal level determining means 701 determines the level of the acceleration signal outputted from the amplifying means 106a or 106b in correspondence with the walking sensor 101a or 101b used for detecting walking (step S803), CPU 108 sets mask time in accordance with the acceleration signal level determined by the signal level determining means 701 in reference to an acceleration level-mask time table and returns to the processing step S504 (step S804). Here, CPU 108 functions as mask time changing means.

Thereby, even when the acceleration signal level is rapidly changed, that is, even when the walking pitch is rapidly changed, walking can accurately be measured.

On the other hand, when the interval of the walking signal from the walking sensor 101a or 101b is not shorter than the predetermined stop determining time at the processing step S505, CPU 108 determines that the signal from the OR means 114 is not a walking signal by regular walking and returns to the processing step S501.

Further, when it is determined that the signals from the walking sensor 101a and 101b are not signals by walking at the processing step S503, CPU 108 determines that the walking is stopped so that the walking signals are not provided from the walking sensors 101a and 101b and returns to the processing step S501.

As described above, according to the embodiment, the mask time is changed based on the walking pitch by calculating immediate walking pitch, and therefore, even when the same user changes the walking pitch or even when a plurality of users having different walking pitches commonly use the pedometer, the step number can accurately be measured.

Figure 9:
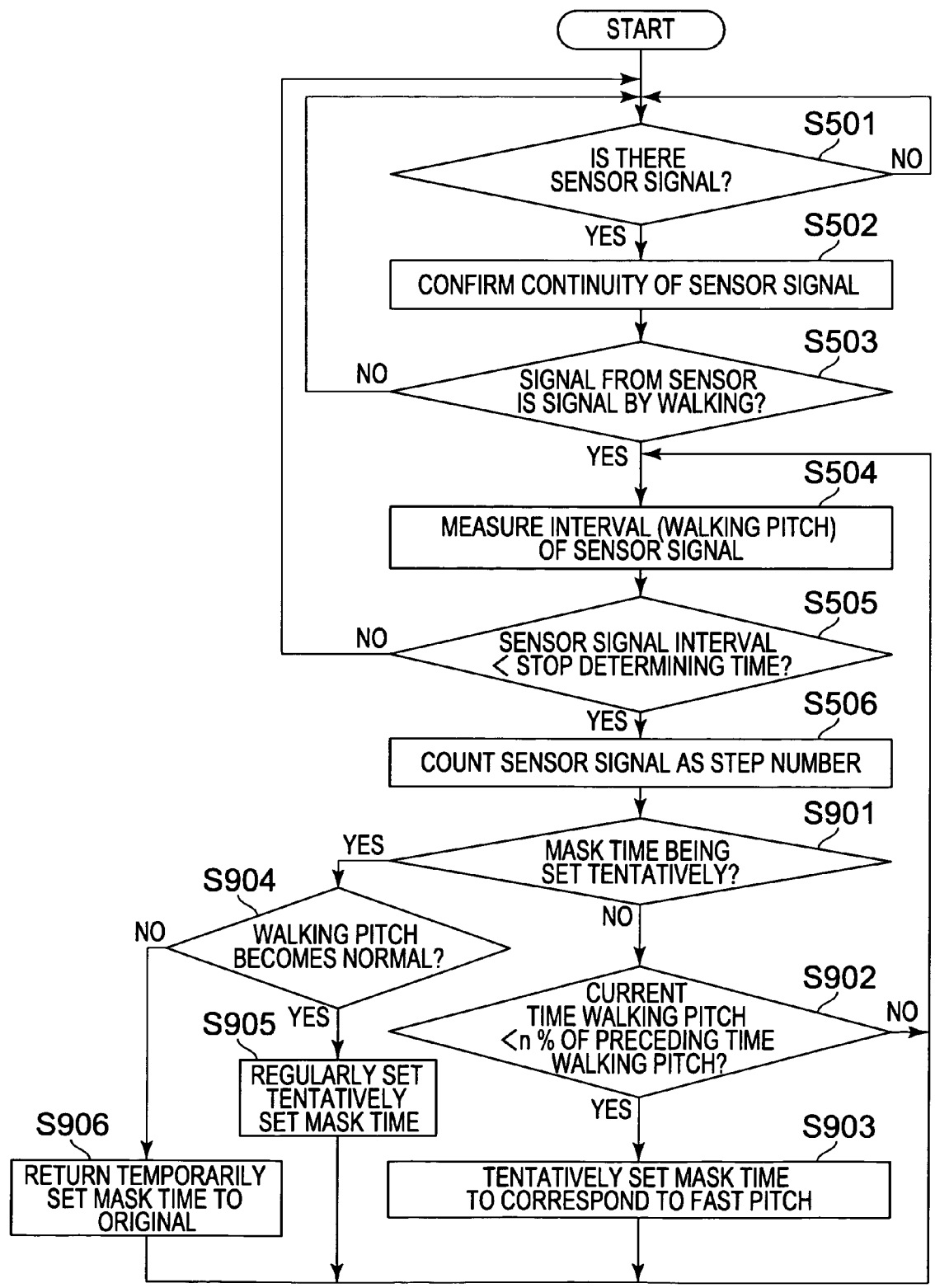
FIG. 9 is a flowchart showing a processing of the pedometer according to the embodiment of the invention.

FIG. 9 is a flowchart showing a processing of a pedometer according to still other embodiment of the invention, showing an example of setting mask time further accurately based on the immediate walking pitch. Portions the same as those of FIG. 5 are attached with the same notations. Further, a block diagram of the embodiment is the same as FIG. 1.

Operation of the other embodiment will be explained in reference to FIG. 1 and FIG. 9 as follows.

When it is determined that there is a signal from at least one of the walking sensors 101a and 101b based on the walking signal S3 from the OR means 114 (step S501), CPU 108 confirms that the signal from at least one of the walking sensors 101a and 101b is provided continuously for predetermined time based on the walking signal S3 (continuity) (step S502). Here, the predetermined time can be set to time to a degree normally required for walking, for example, 5 steps (for example, 10 seconds).

Further, when the signal outputted from the OR means 114 is detected, as described above, CPU 108 is operated to alternately carry out the detecting operation and the mask operation at each time of detecting respective signals. Further, when the walking signal is detected, CPU 108 can start the operation of alternately carrying out the detecting operation and the mask operation from when the walking signal S3 is detected first. Thereby, the walking signal S3 from the walking sensor 101a or 101b precedingly detecting the walking signal S3 can successively be detected and the step number can be measured accurately and swiftly.

When the walking signal S3 from the OR means 114 is provided continuously for predetermined time, that is, when the signal from at least one of the walking sensors 101a and 101b is provided continuously for the predetermined time, CPU 108 determines that the signal from at least one of the walking sensors 101a and 101b (in other words, walking signal S3) is the walking signal in correspondence with walking (step S503).

Next, CPU 108 measures an interval of the walking signal from the walking sensor 101a or 101b to be used for detecting walking (walking pitch) based on the walking signal S3 from the OR means 114 (step S504).

When the interval of the walking signal S3 from the OR means 114 is shorter than the stop determining time, that is, when the interval of the walking signal from the walking sensor 101*a* or 101*b* to be used for detecting walking is shorter than the predetermined stop determining time period, CPU 108 determines the walking signal by regular walking (step S505), and counts the walking signal S3 from the OR means 114 as the step number (step S506). The stop determining time is time constituting a reference of determining whether walking is carried out or walking is stopped and can be set to time to a degree normally required for walking of, for example, 1 step (for example, 2 seconds).

CPU 108 determines a state of tentatively setting the mask time (step S901), in a case of determining that the mask time is not tentatively set, that is, in a case of determining the normal operation, when walking pitch of a current time is smaller than predetermined % (n %; for example, n=70%) of the walking pitch of the preceding time (immediate proximity), there is a possibility of bringing about an omission of detecting walking by rapidly increasing the walking pitch, and therefore, CPU 108 determines that there is a possibility of rapidly changing the walking pitch and tentatively sets the mask time to correspond to a fast pitch (steps S902, S903). In tentatively setting the mask time, mask time of time width in correspondence with the walking pitch is set in reference to walking pitch-mask time width table previously stored to the storing means 113. Here, CPU 108 functions as mask time changing means.

When it is determined that the walking pitch of the current time is not smaller than predetermined % (n %; for example, n=70%) of the walking pitch at preceding time in the processing step S902, CPU 108 determines the pitch is not a rapid walking pitch and returns to the processing step S504.

On the other hand, when it is determined that the mask time is tentatively set at the processing step S901, CPU 108 determines whether a walking signal of a correct walking pitch can be detected under the state (step S904). Here, when a walking pitch equal to or larger than a predetermined value (for example, 1.6 time) of the rapidly reduced walking pitch is provided, it is determined that the correct walking signal can be detected.

When it is determined that the walking signal of the normal walking pitch can be detected at the processing step S904, CPU 108 sets the tentatively set mask time as regular mask time and corrects the step number by adding a step number generated in the tentatively setting period to an accumulated step number (step S905). Here, CPU 108 functions as mask time changing means.

Further, when it is determined that the walking signal of the normal walking pitch cannot be detected at the processing step S904, CPU 108 determines that the tentatively set mask time is not pertinent (walking pitch is not increased), returns to the mask time periods of original mask time and returns to the processing step S504 (step S906). Here, CPU 108 functions as mask time changing means.

As described above, according to the other embodiment, when the calculated walking pitch is reduced rapidly (predetermined rate or more), the mask time is made to be short (to be able to correspond to fast walking pitch). Further, after shortening the mask time, it is verified whether the change of the mask time is correct by whether the walking pitch can be detected as expected, and when the change is correct, the accumulate step number is calculated by correcting the step number changing the walking pitch. Therefore, even when the mask time is changed in accordance with the change of the walking pitch, the step number can accurately be measured.

Figure 10:
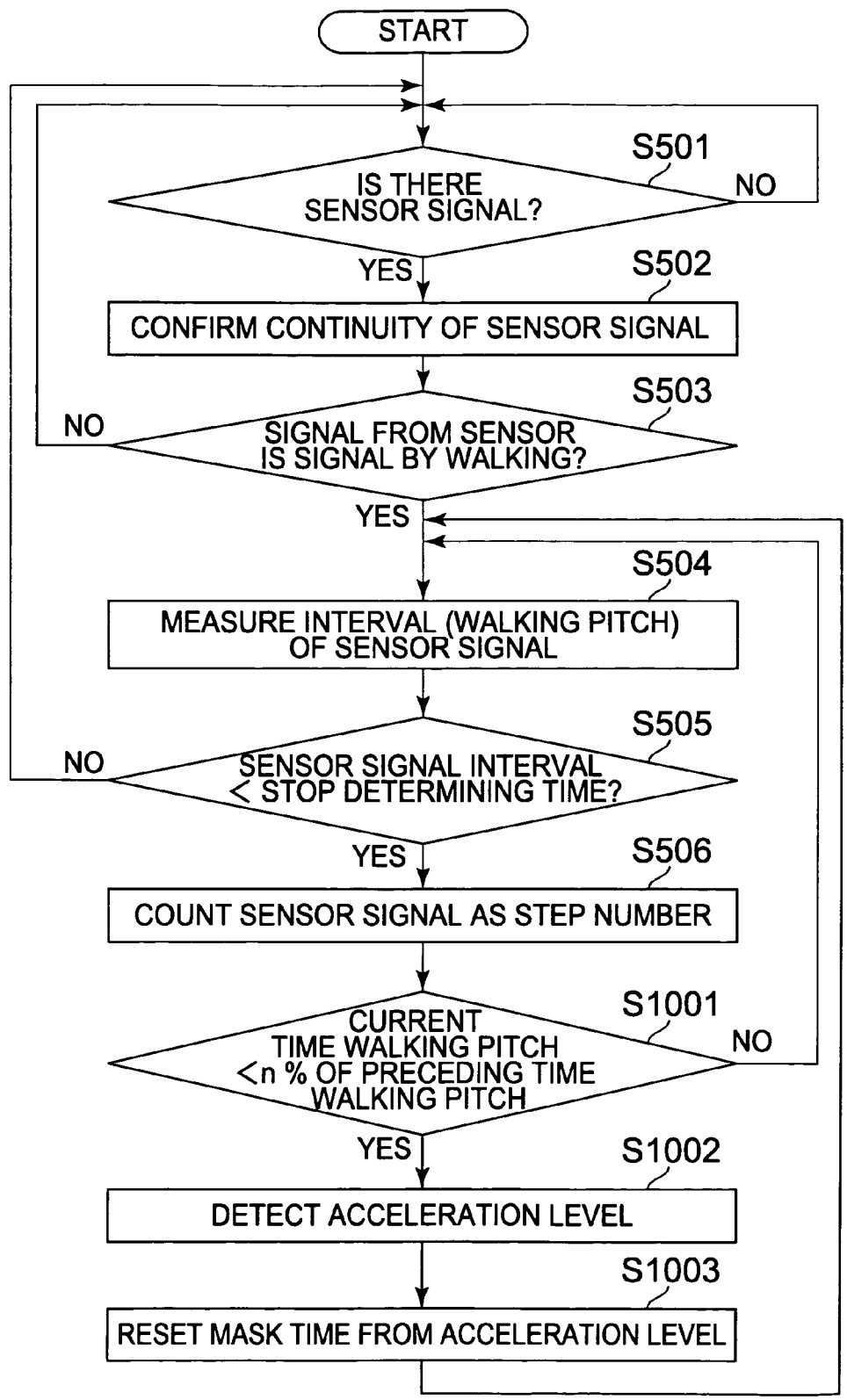
FIG. 10 is a flowchart showing a processing of the pedometer according to the embodiment of the invention.

FIG. 10 is a flowchart showing a processing of a pedometer according to still other embodiment of the invention, showing an example of setting mask time based on the walking pitch and the acceleration signal level. Further, portions the same as those of FIG. 5 are attached with the same notations. Further, a block diagram of the other embodiment is the same as FIG. 7.

An operation of the other embodiment will be explained in reference to FIG. 7 and FIG. 10 as follows.

When it is determined that there is a signal from at least one of the walking sensors 101*a* and 101*b* based on the walking signal S3 from the OR means 114 (step S501), CPU 108 confirms that the signal from at least one of the walking sensors 101*a* and 101*b* is provided continuously for predetermined time based on the walking signal S3 (continuity) (step S502). Here, the predetermined time can be set to time to a degree normally required for walking, for example, 5 steps (for example, 10 seconds).

Further, CPU 108 is operated to alternately carry out the detecting operation and the mask operation at each time of detecting each signal as described above, when the signal outputted from the OR means 114 is detected. Further, CPU 108 can start the operation of alternately carrying out the detecting operation and the mask operation from when the walking signal S3 is detected first, when the walking signal is detected. Thereby, the walking signal S3 from the walking sensor 101*a* or 101*b* precedingly detecting the walking signal S3 can successively be detected and the step number can be measured accurately and swiftly.

When the walking signal S3 from the OR means 114 is provided continuously for predetermined time, that is, when the signal from at least one of the walking sensors 101*a* and 101*b* is provided continuously for the predetermined time, CPU 108 determines that the signal from at least one of the walking sensors 101*a* and 101*b* (in other words, walking signal S3) is a walking signal in correspondence with walking (step S503).

Next, CPU 108 measures an interval of the walking signal from the walking sensor 101*a* or 101*b* to be used for detecting walking based on the walking signal S3 from the OR means 114 (walking pitch) (step S504).

When the interval of the walking signal S3 from the OR means 114 is shorter than predetermined stop determining time, that is, when the interval of the walking signal from the walking sensor 101*a* or 101*b* to be used for detecting walking is shorter than the predetermined stop determining time, CPU 108 determines the walking signal by regular walking (step S505), and counts the walking signal S3 from the OR means 114 as step number (step S506). The stop determining time is time constituting a reference of whether walking is carried out or walking is stopped and can be set to time to a degree normally required for walking, for example, 1 step (for example, 2 seconds).

Next, when it is determined that the walking pitch at current time is smaller than predetermined % (n %; for example, n=70%) of the walking pitch at preceding time (immediate proximity) (step S1001), the signal level determining means 701 determines a level of an acceleration signal outputted from the amplifying means 106*a* or 106*b* in correspondence with the walking sensor 101*a* or 101*b* used for detecting walking (step S1002), and CPU 108 refers to an acceleration level-mask time table previously stored to the storing means 113, resets the mask time to mask time in accordance with the acceleration signal level determined by the signal level determining means 701 and returns to the processing step S504 (step S1003). Here, CPU 108 functions as mask time changing means.

CPU 108 returns to the processing step S504 when it is determined that the walking pitch of current time is not smaller than the predetermined % of the walking pitch of preceding time at the processing step S1001.

As described above, according to the other embodiment, CPU 108 sets the mask time in correspondence with the acceleration signal level when the immediate walking pitch is changed by a predetermined value or more, and changes the mask time when both of the walking pitch and the acceleration signal level are changed, and therefore, the mask time can further accurately be set.

Further, in the respective embodiments, there may be constructed a constitution in which a walking data of a step number data or the like in the past is stored to the walking means 113, CPU 108 sets an initial value of the mask time based on the walking pitch provided from the past walking data. In this case, CPU 108 constitutes mask time initial value setting means.

Further, CPU 108 may be constituted such that an initial value of the mask time is set based on a personal data inputted from the inputting means 109. Although as the personal data, for example, there is information that the walking speed is classified to any of 3 stages of fast, about middle, slow or information of walking width, information of the walking width may be dispensed with. Also in this case, CPU 108 constitutes mask time initial value setting means.

The invention is applicable to various kinds of pedometers of a pedometer of a type of being used by being mounted to the arm, a pedometer of a type of being used by being mounted to the waist, a pedometer of a type of being used in a state of being held by being contained in a bag or the like, a pedometer including a timepiece function or the like.

What is claimed is:

1. A pedometer comprising:
    a plurality of walking sensors that have respective sensitivity axes which differ from each other and that detect acceleration motion of a user during walking and output acceleration signals indicative of walking;
    a plurality of walking detecting means responsive to the acceleration signals for outputting walking signals in correspondence with walking detected by the walking sensors; and
    calculating means for detecting the walking signals from the plurality of walking detecting means and calculating a step number based on the detected walking signals;
    wherein the calculating means alternately carries out a detecting operation which detects the walking signals and a mask operation which does not detect the walking signals in a predetermined mask time after the detecting operation when the walking signals are detected,
    wherein the calculating means sets the mask time to a value of a range equal to or larger than a half of a walking signal period of the walking signal in correspondence with a lower limit of the measurable walking pitch and equal to or smaller than the walking signal period of the walking signal in correspondence with an upper limit value of the measurable walking pitch,
    wherein the calculating means includes converting means for synthesizing the walking signals inputted in parallel from the plurality of walking detecting means to convert them into a synthesized walking signal, wherein when the calculating means detects the synthesized walking signal, a detecting operation of detecting the synthesized walking signal and the mask operation at the mask time after the detecting operation are alternately carried out, and
    wherein the converting means comprises logical operating means for converting a logical sum of the walking signals inputted in parallel from the plurality of walking detecting means into the synthesized walking signal synthesized by logically operating the walking signals.

2. A pedometer according to claim 1; wherein when the walking signal is detected, the calculating means starts the operation of alternately carrying out the detecting operation and the mask operation from when the walking signal is detected first.

3. A pedometer according to claim 1; wherein the calculating means sets a value based on a walking pitch as the mask time.

4. A pedometer according to claim 1; further including mask time changing means for setting the mask time in accordance with an immediate proximity of the walking pitch.

5. A pedometer according to claim 4; wherein when the immediate proximity of the pitch is changed by a predetermined value or more, the mask time changing means tentatively sets the mask time to a mask time in correspondence with the immediate proximity of the pitch and sets the tentatively set mask time to a regular mask time when a correct walking signal is provided by the tentatively set mask time.

6. A pedometer according to claim 5; wherein when the tentatively set mask time is set as the regular mask time, the calculating means corrects an accumulated step number by a step number generated in the tentatively setting period.

7. A pedometer according to claim 4; wherein when the immediate proximity of the pitch is changed by the predetermined value or more, the mask time changing means sets the mask time in accordance with the level of the acceleration signals outputted from the walking sensors.

8. A pedometer according to claim 1; further including mask time initial value setting means for setting an initial value of the mask time based on the walking pitch provided from past walking data stored to storing means.

9. A pedometer according to claim 1; further including mask time initial value setting means having inputting means for setting an initial value of the mask time based on a personal data inputted from the inputting means.

10. A pedometer having walking sensors that have sensitivity axes which differ from each other, the pedometer comprising:
    a plurality of walking detecting means for outputting walking signals in correspondence with walking detected by the walking sensors;
    calculating means for detecting the walking signals from the plurality of walking detecting means and calculating a step number based on the detected walking signals; and
    mask time changing means for setting the mask time in accordance with an immediate proximity of the walking pitch;
    wherein the calculating means alternately carries out a detecting operation which detects the walking signals and a mask operation which does not detect the walking signals in a predetermined mask time after the detecting operation when the walking signals are detected, and
    wherein when the immediate proximity of the pitch is changed by a predetermined value or more, the mask time changing means tentatively sets the mask time to a mask time in correspondence with the immediate proximity of the pitch and sets the tentatively set mask time to a regular mask time when a correct walking signal is provided by the tentatively set mask time.

11. A pedometer according to claim 10; wherein when the tentatively set mask time is set as the regular mask time, the calculating means corrects an accumulated step number by a step number generated in the tentatively setting period.

12. A pedometer having walking sensors that have sensitivity axes which differ from each other, the pedometer comprising:

a plurality of walking detecting means for outputting walking signals in correspondence with walking detected by the walking sensors;

calculating means for detecting the walking signals from the plurality of walking detecting means and calculating a step number based on the detected walking signals; and mask time initial value setting means for setting an initial value of the mask time based on the walking pitch provided from past walking data stored to storing means;

wherein the calculating means alternately carries out a detecting operation which detects the walking signals and a mask operation which does not detect the walking signals in a predetermined mask time after the detecting operation when the walking signals are detected, and wherein when the immediate proximity of the pitch is changed by a predetermined value or more, the mask time changing means tentatively sets the mask time to a mask time in correspondence with the immediate proximity of the pitch and sets the tentatively set mask time to a regular mask time when a correct walking signal is provided by the tentatively set mask time.

* * * * *